US008687786B2

(12) United States Patent
Chiczewski et al.

(10) Patent No.: US 8,687,786 B2
(45) Date of Patent: *Apr. 1, 2014

(54) REMOVING SLAMMING PROTECTION TO PERMIT A CHANGE IN SERVICE PROVIDERS

(75) Inventors: Robert Chiczewski, Oxford, MI (US); Tami Durbon, Lakemoor, IL (US); Frank N. Fedele, Glen Ellyn, IL (US); Umadevi Kanakasabai, Novi, MI (US); Michaeline Klebba, San Antonio, TX (US); Stanford Emery Pennington, Jr., San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/299,655

(22) Filed: Nov. 18, 2011

(65) Prior Publication Data

US 2012/0063581 A1  Mar. 15, 2012

Related U.S. Application Data

(63) Continuation of application No. 11/696,277, filed on Apr. 4, 2007, now Pat. No. 8,085,917, which is a continuation of application No. 10/252,033, filed on Sep. 23, 2002, now Pat. No. 7,221,749.

(51) Int. Cl.
*H04M 3/42* (2006.01)

(52) U.S. Cl.
USPC .................................. 379/201.01; 379/201.05

(58) Field of Classification Search
USPC ............. 379/201.01, 201.02, 201.05, 201.12, 379/202.01, 207.01, 207.02
See application file for complete search history.

(56) References Cited

U.S. PATENT DOCUMENTS

| 5,903,737 | A | * | 5/1999 | Han | 710/100 |
| 6,085,171 | A | * | 7/2000 | Leonard | 705/26.35 |
| 6,246,988 | B1 | | 6/2001 | Scheir | |
| 6,356,868 | B1 | | 3/2002 | Yuschik et al. | |
| 6,401,066 | B1 | | 6/2002 | McIntosh | |
| 6,650,736 | B1 | | 11/2003 | Unger et al. | |
| 6,862,343 | B1 | | 3/2005 | Vacek et al. | |
| 7,130,800 | B1 | * | 10/2006 | Currey et al. | 704/273 |
| 7,379,881 | B2 | | 5/2008 | Smithies et al. | |
| 7,974,396 | B2 | * | 7/2011 | McQuilkin et al. | 379/201.01 |

(Continued)

OTHER PUBLICATIONS

"Database Marketing Institute: Did You Really Mean It?—Third Party Verification" by Arthur Middleton Hughes, Jul. 9, 2002.

(Continued)

*Primary Examiner* — William Deane, Jr.
(74) *Attorney, Agent, or Firm* — Greenblum & Bernstein, P.L.C.

(57) ABSTRACT

A designated service provider of a customer having slamming protection on their account may not be changed without authorization from the customer to remove the slamming protection. When a customer's telephone company receives a request to change the customer's long distance provider and subsequently determines that the customer has slamming protection on their account, the telephone company notifies the requester that the requested change may not be provisioned due to the slamming protection. The customer's authorization to remove the slamming protection is provided by the requester in the form of an audio file that is reviewed by the telephone company. If the telephone company or an agent of the telephone company listens to the audio file and approves the request, then the customer's slamming protection is removed.

20 Claims, 6 Drawing Sheets

(56) References Cited

U.S. PATENT DOCUMENTS

| | | | |
|---|---|---|---|
| 7,983,412 B2 * | 7/2011 | Joseph et al. | 379/265.03 |
| 8,073,742 B2 * | 12/2011 | Caballero et al. | 705/26.1 |
| 8,073,777 B2 * | 12/2011 | Barry et al. | 705/50 |
| 2002/0111809 A1 | 8/2002 | McIntosh | |
| 2003/0069804 A1 | 4/2003 | Barry et al. | |

OTHER PUBLICATIONS

Screen-shot of online document "3rd Party Verification: Automated Speech Enabled Confirmations" copyright 2002 by Eyretel plc. (Publication date Unknown).

Screen-Shot of online document entitled "Contact Archive Manager", copyright 2001-2002, by Eyretel plc. (Publication date unknown).

"Insight Viewer" 2001-2002 Eyretel plc. (Publication date Unknown).

Screen-shot of Yahoo! Finance online article entitled "iBasis Selects Eyretel for Reording and Retrieval of Third Party Verification Interactions" Apr. 9, 2002.

Screen-shot of an online document entitled "Sales Confirmation Solutions," (publication date is unknown).

* cited by examiner

| | Position | Format | Description | CARE Position |
|---|---|---|---|---|
| 405 | 1-4 | X(4) | Carrier Identification Code (*e.g.*, 0222=MCI) | 433-436 |
| 406 | 5-8 | X(4) | Local Exchange Carrier Identification Code | |
| 407 | 9-18 | 9(10) | Working Telephone Number (WTN) | 21-30 |
| 408 | 19 | X(1) | Jurisdictional Indicator (Values: A=Intra/LPIC, E=Inter/PIC) | 403 |
| 409 | 20-25 | 9(6) | Date on 2166 Record (Format: YYMMDD) | 39-44 |
| 410 | 26 | X(1) | Language Indicator (Values: E=English, S=Spanish) | 387 |
| 411 | 27 | X(1) | Reserved for Disposition Code | |
| 412 | 28-100 | X(73) | Reserved for Future Use | |
| 413 | 101-? | X(?) | Fully Qualified URL to Recording File | |

| | Position | Format | Description | CARE Position |
|---|---|---|---|---|
| 505 | 1-4 | X(4) | Carrier Identification Code (e.g., 0222=MCI) | 433-436 |
| 506 | 5-8 | X(4) | Local Exchange Carrier Identification Code | |
| 507 | 9-18 | 9(10) | Working Telephone Number (WTN) | 21-30 |
| 508 | 19 | X(1) | Jurisdictional Indicator (Values: A=Intra/LPIC, E=Inter/PIC) | 403 |
| 509 | 20-25 | 9(6) | Date on 2166 Record (Format: YYMMDD) | 39-44 |
| 510 | 26 | X(1) | Language Indicator (Values: E=English, S=Spanish) | 387 |
| 511 | 27 | X(1) | Disposition Code | |
| 512 | 28-100 | X(73) | Reserved for Future Use | |
| 513 | 101-? | X(?) | Fully Qualified URL to Recording File | |

REMOVING SLAMMING PROTECTION TO PERMIT A CHANGE IN SERVICE PROVIDERS

This is a continuation of pending U.S. patent application Ser. No. 11/696,277, filed Apr. 4, 2007, which is a continuation of U.S. patent application Ser. No. 10/252,033, filed Sep. 23, 2002, now U.S. Pat. No. 7,221,749 which issued May 22, 2007, the contents of which are expressly incorporated by reference herein in their entireties.

BACKGROUND OF THE INVENTION

Field of the Invention

The present invention is related to the field of telecommunications. More particularly, the present invention relates to removing slamming protection from a customer's account when the customer wants to change their preferred long distance provider.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Acronyms

Ameritech Service Order Negotiation (ASON)
Billing Telephone Number (BTN)
Carrier Identification Code (CIC)
Carrier Request (CR)
Customer Account Record Exchange (CARE)
Electronic 3-Way Call (E3WC)
Extensible Markup Language (XML)
Federal Communications Commission (FCC)
File Transport Protocol (FTP)
Graphical User Interface (GUI)
Hypertext Markup Language (HTML)
Hypertext Transfer Protocol (HTTP)
Hypertext Transfer Protocol Secure (HTTPS)
Interactive Voice Response (IVR)
Local Access and Transport Area (LATA)
Local Exchange Carrier (LEC)
Local Preferred Interexchange Carrier (LPIC)
Multiple Virtual Storage (MVS)
Preferred Interexchange Carrier (PIC)
Public Switched Telephone Network (PSTN)
Service Order Server Applications (SOSA)
Telephone Number (TN)
Third Party Verification (TPV)
Uniform Resource Locator (URL)
Working Telephone Number (WTN)

Background and Material Information

In the past, if a potential customer consented to a change in their long distance carrier, then the long distance carrier would contact the customer's local telephone company to provision the change. Eventually, however, certain long distance companies began contacting local telephone companies and indicating that a potential customer had authorized a change in their long distance carrier, when in fact no such consent was granted by the customer. Ignorant of the falsehood, the customer's local telephone company would change the service as instructed by the carrier and the customer would receive service and incur charges from the newly provisioned long distance provider. This illegal practice eventually became known as slamming. In response to the advent of slamming, the Federal Communications Commission (FCC) adopted a requirement that the new service provider must first obtain third party verification (TPV) before a customer is switched to a new long distance carrier. The TPV is recorded and performed by an entity distinct from the long distance carrier and serves to verify that the customer consents to the change.

Thus, when a long distance carrier makes a sale to a customer, a TPV is performed and a recording is made of the telephone conversation. Then, the long distance provider submits a request to change the customer's long distance provider. If the customer has slamming protection on their account, then the local telephone company may not provision the change in long distance providers and notifies the long distance provider accordingly.

As a result, the long distance carrier will typically contact the customer and request that the customer contact their local telephone company and indicate that slamming protection be removed from their account. Alternatively, a three-way call may be attempted between the customer, the long distance provider, and the local telephone company. Often, a customer cannot be reached or does not have time to contact their local phone company. This is especially true when attempting to schedule a three-way call. In any event, the resulting frustration may result in lost sales for the carrier.

Therefore, it would be advantageous to automate and streamline the process of removing slamming protection from a customer's account when the customer wants to change their preferred long distance provider.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 4 shows an exemplary request record, according to an aspect of the present invention;

FIG. 5 shows an exemplary disposition record, according to an aspect of the present invention.

DETAILED DESCRIPTION OF EMBODIMENTS

Figure 1:
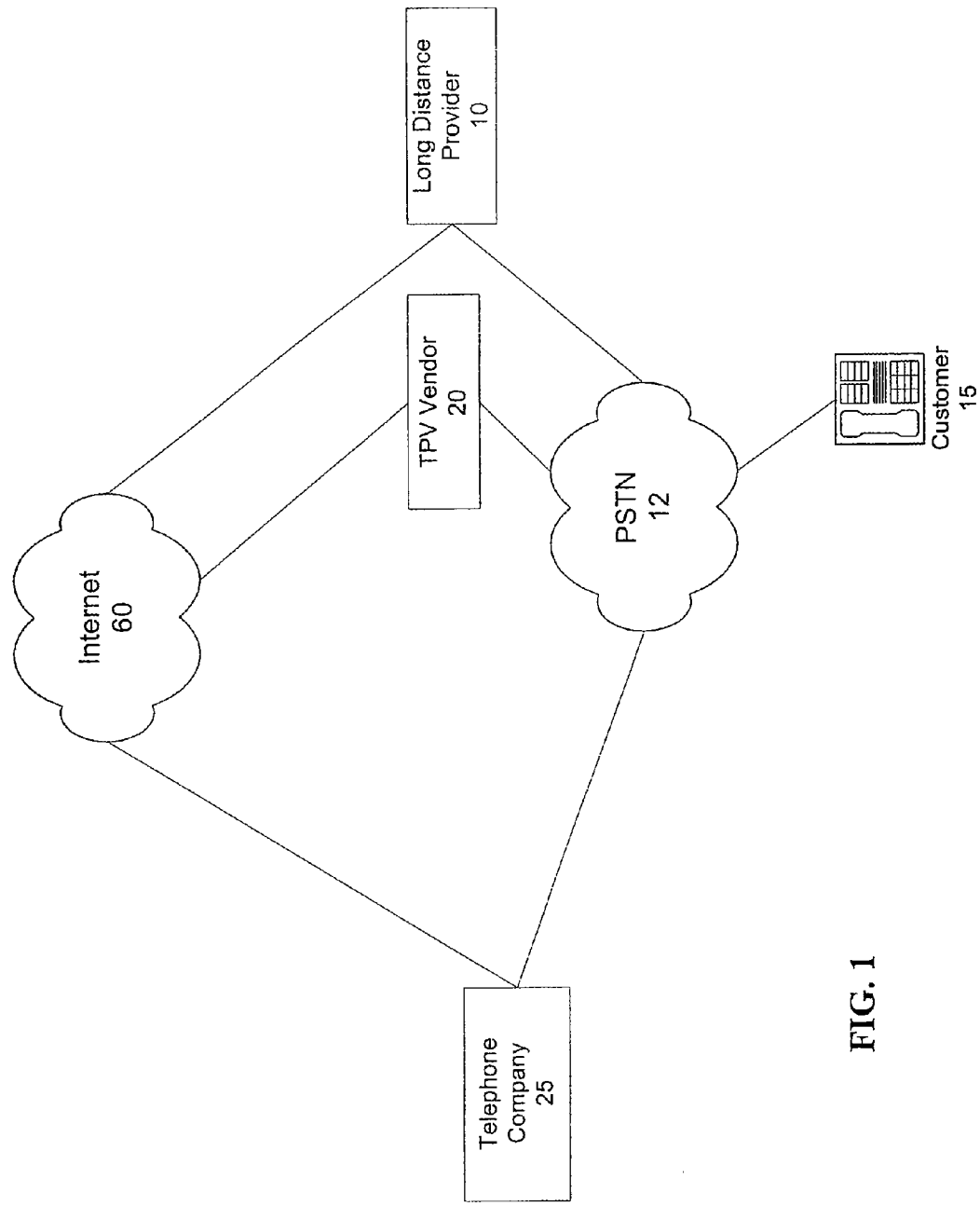
FIG. 1 is a block diagram showing an exemplary telecommunications network, according to an aspect of the present invention.

The present invention relates to an automated, streamlined process for allowing a customer to remove slamming protection from their account when they would like to change their long distance provider. Slamming protection, also known as a preferred interexchange carrier (PIC) freeze, prevents a customer's long distance provider from being changed. The customer's PIC provides the customer's long distance service for inter-LATA calls. Related thereto, a local preferred interexchange carrier (LPIC), provides the customer's local toll service for intra-LATA calls. Thus, the term long distance carrier/provider, as used herein, includes both PICs and LPICs. In addition, the terms long distance provider, long distance carrier, and service provider are used interchangeably herein. Further, the terms telephone company, local telephone company, and telco are used interchangeably herein.

In view of the above, the present invention through one or more of its various aspects and/or embodiments is presented to accomplish one or more objectives and advantages, such as those noted below.

Accordingly, one aspect of the present invention is to provide a method for removing a protection associated with a customer's account that prevents a change of the customer's service provider. The method includes receiving a request to remove the protection from the customer's account, wherein the request includes an audio file that includes the customer's authorization to remove the protection. The method further includes listening to the customer's authorization in the audio file and determining whether to remove the protection. Then, the protection is removed when the determination indicates that the protection is to be removed.

The audio file including the customer's authorization may be referenced by a hyperlink associated with the audio file. The protection associated with the customer's account includes slamming protection and the service provider may be the customer's preferred interexchange carrier (PIC) and/or the customer's local preferred interexchange carrier (LPIC).

Another aspect of the present invention is to provide a method for removing a protection associated with a customer's account that prevents a change of the customer's service provider. The method includes receiving a request to change the customer's service provider and determining that the requested change cannot be provisioned due to the protection associated with the customer's account. In response to the determination, notification is provided that the change cannot be provisioned without the customer authorizing removal of the protection. Then, the customer's authorization to remove the protection is received and reviewed and a decision is made as to whether to remove the protection based upon the review of the customer's authorization.

If approved, the protection associated with the customer's account may be removed, thereby enabling the customer's service provider to be changed. In addition, a disposition notice may be sent in response to a resolution as to whether to remove the protection.

The protection associated with the customer's account includes slamming protection and the service provider may be the customer's PIC and/or LPIC.

The request may include customer account information and the customer's authorization to remove the protection may be accessed via a hyperlink associated with an audio file.

Another aspect of the present invention is to provide a method for removing slamming protection from a customer's account when the customer has requested a service provider change. The method includes presenting a script to the customer that solicits at least one response from the customer including whether the customer authorizes the removal of slamming protection from the customer' account. In addition, the method includes recording and storing the script and the at least one customer response and then sending a request via the Internet requesting that the slamming protection be removed from the customer's account. The request includes a link associated with an audio file that contains the recording of the customer's authorization to remove the slamming protection.

The request may be sent in response to a rejection received from the customer's local telephone company to change the service provider of the customer. The rejection is reviewed and notification of the rejection may be submitted to a third party verification vendor. In this case, the third party verification vendor receives the notification and reviews the customer's authorization. In addition, the third party verification vendor may edit the audio file.

The request may be sent by the service provider, which may be the customer's PIC and/or LPIC. Otherwise, the request may be sent by a third party verification vendor.

Another aspect of the present invention is to provide a system for removing a protection preventing the change of a customer's service provider without authorization of the customer. The system includes a server that receives a request to remove the protection, in which the request includes a link to an audio file of the customer authorizing the removal of the protection. The system also includes a database that stores customer information and compares the information associated with the request against the stored customer information. Also, a client is provided that activates the link causing the audio file to play. The system may also include a computer that generates an order to remove the protection.

Another aspect of the present invention is to provide a method for effecting a change associated with a customer's account in which the change requires a verbal authorization of the customer. The method includes receiving a request to effect a change on the customer's account, in which the request includes an audio file containing the customer's authorization to effect the change and referencing the audio file by a hyperlink associated with the audio file. The method further includes listening to the customer's authorization in the audio file and determining whether to effect the change and effecting the change when the determination indicates that the change should be effected.

FIG. 1 is a block diagram showing an exemplary telecommunications network, according to an aspect of the present invention. A long distance provider 10 communicates through a communications network such as the public switched telephone network (PSTN) 12 with a customer 15. The means of communication between the long distance provider 10 and the customer 15 is not limited to the PSTN 12 and may include, for example, communications such as Internet telephony. The long distance provider 10 attempts to acquire the prospective business of the customer 15. If the long distance provider successfully markets itself and makes a sale to provide future long distance services to the customer 15, then TPV is performed by a TPV vendor 20, on behalf of the long distance provider 10, in accordance with FCC requirements.

Thus, the customer 15 is transferred to the TPV vendor 20 and the long distance provider 10 is disconnected from the call with the customer 15. Depending upon regulations, the long distance provider 10 may remain on the line while the TPV is performed. In any event, the TPV is performed by the TPV vendor 20 using an interactive voice response (IVR) system. Otherwise, the TPV may be conducted by a live operator of the TPV vendor 20. Whether an IVR or live operator is used by the TPV vendor 20, TPV is performed and in doing so, a recording (e.g., an audio recording) is made of the exchange between the TPV vendor 20 and the customer 15, to verify the customer's desire to change carriers.

In addition, a script is presented to the customer 15 asking for consent to remove slamming protection from their account in order to change the customer's current long distance provider. The script is typically performed by the TPV vendor; however, the long distance provider 10 may perform this function in which case the long distance provider 10 must be re-connected with the customer 15. In presenting the script to the customer 15, certain identifying information is elicited from the customer, e.g., name, social security number, date of birth, telephone number in which change will be made, whether the customer 15 is authorized to order that the slamming protection be removed from the account, whether the customer consents to the having a recording of the telephone call sent to the telephone company 25, etc. This is known as the electronic 3-way call (E3WC) process script. Further, the name of the new long distance provider may be included in the script that is presented to the customer 15. The E3WC script presented to the customer 15, along with the customer's responses are recorded and stored on a web server. The web server storing the script and response may be located, for example, at the long distance provider 10 or the TPV vendor 20. Thus, an E3WC is performed and in doing so, a recording (e.g., an audio recording) is made of the exchange between the TPV vendor 20 and the customer 15, for the approval to remove the slamming protection on the customer's 15 account.

If the E3WC script is performed by the TPV vendor 20, then the TPV vendor 20 may make a cropped recording of the original recording removing, for example, the TPV pertaining to the change of providers. In this case, the cropped recording is stored on a web server as noted above.

The telephone company 25 receives requests from the long distance provider 10 to change a customer's PIC and/or LPIC. These requests are received via the known customer account record exchange (CARE) or other known manner. CARE is a system that facilitates the exchange of customer account information between telecommunications entities in order to provision services. Essentially, CARE provides a consistent definition and data format for the exchange of common data elements. If the customer 15 has slamming protection on their account, then the telephone company 25 would be unable to process the request to change the customer's PIC and/or LPIC for reasons previously discussed. As a result, the telephone company 25 sends a message via CARE to the long distance provider 10 indicating that the request to change the customer's PIC and/or LPIC has been rejected (as will be discussed in more detail below) and that the customer 15 has slamming protection on their account, an indication that the potential customer's consent to remove slamming protection must be provided.

Thereafter, and as will be explained in more detail below, the long distance provider 10 or the TPV vendor 20 provides the telephone company 25 with customer account information and a uniform resource locator (URL) hyperlink that references an audio file (i.e., E3WC) of the exchange between the customer 15 and the TPV vendor 20. The hyperlink may employ, for example, the hypertext markup language (HTML), the extensible markup language (XML), or any equivalents.

The audio file purportedly contains the customer's consent to remove the PIC and/or LPIC slamming protection. Then, once an agent of the telephone company 25 reviews the audio recording, a decision is made as to whether to approve or deny the request to remove the slamming protection. If the request is approved, a service order is generated by the telephone company 25 and the slamming protection is removed. In any event, a disposition file is sent to the long distance provider 10 and/or the TPV vendor 20 advising the recipient of the disposition.

Figure 2:
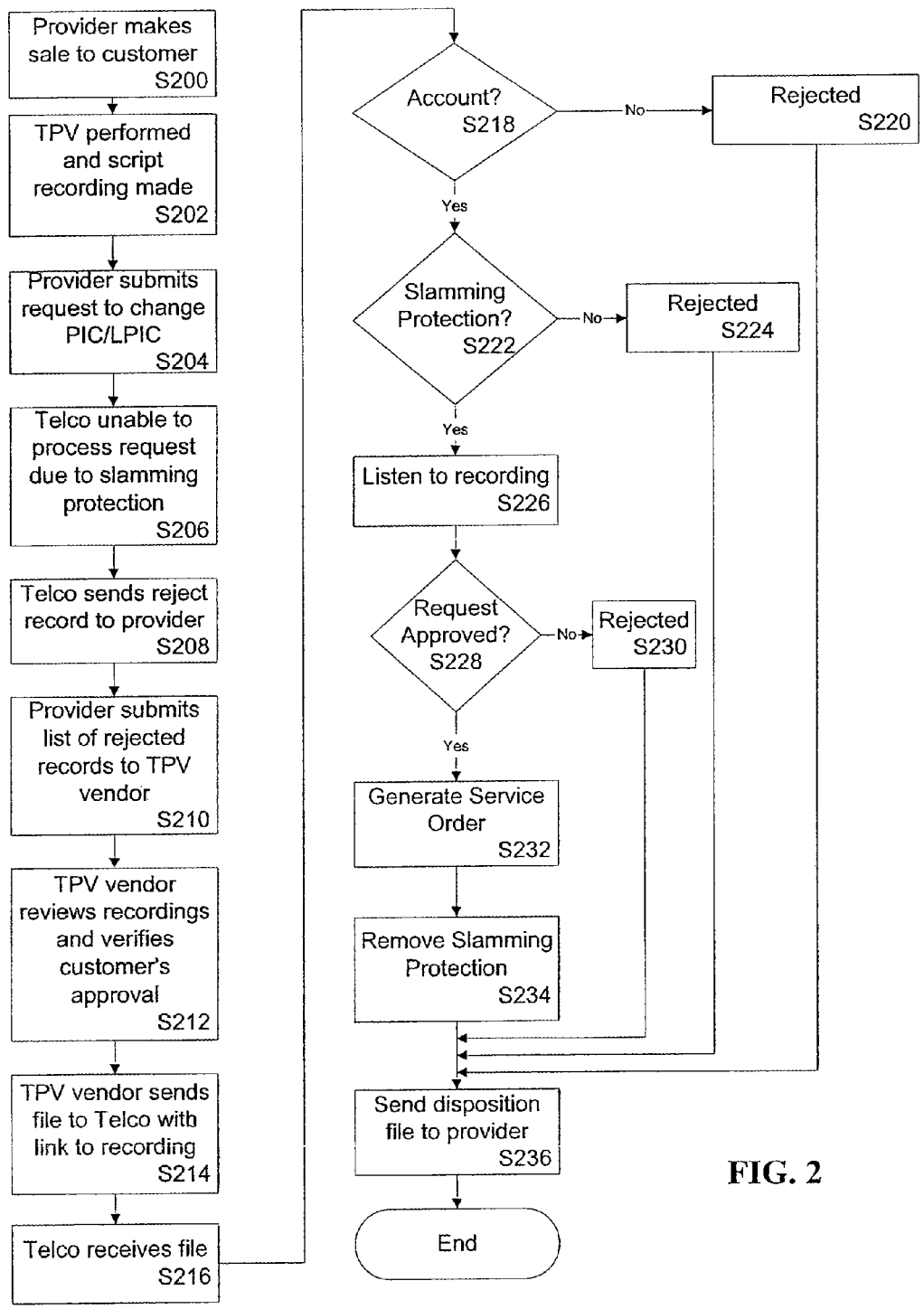
FIG. 2 is an exemplary flow diagram, according to an aspect of the present invention.

FIG. 2 is an exemplary flow diagram, according to an aspect of the present invention. At step S200, a representative of the long distance provider 10, in communication with the customer 15 receives verbal indication from the customer 15 that the customer 15 would like to switch their long distance service to the provider of the representative.

At step S202, TPV is performed and a recording is made of the exchange between the TPV vendor 20 and the customer 15, including the script and responses. As discussed, the TPV vendor 20 follows the TPV process with a script asking the customer for consent to remove slamming protection from their account in order to change the long distance provider, thus performing an initial portion of an E3WC.

An exemplary script employed by an IVR or operator of the TPV vendor 20 may include "Please identify yourself by name, social security number, and/or date of birth". In addition, the customer 15 may be asked whether they are authorized to request that slamming protection be removed from the account and whether they consent to have the conversation recorded. After the customer 15 provides the requested information, the exemplary script may continue as follows: "If you have slamming protection on your account, do you consent to have the protection removed so that your long distance provider may be changed?" In addition, the name of the long distance provider and/or any other relevant information may be included in the script.

At step S204, the long distance provider 10 submits a request to the telephone company 25 to change the customer's PIC and/or LPIC. At step S206, the telephone company 25 receives the request and determines that the customer 15 has slamming protection on their account. If no slamming protection exists on the customer's account, then the requested change may be provisioned by known processes.

It is noted that in some jurisdictions, customers may have an option of placing slamming protection on their account. With slamming protection on the account, the telephone company 25 is prohibited from processing the request to change the PIC and/or LPIC without the customer's consent. As a result, at step S208, the telephone company 25 sends a rejection record with a "2166" transaction code to the long distance provider 10. A "2166" transaction code indicates that changing of the PIC/LPIC is restricted and thus, no carrier initiated PIC and/or LPIC changes will be accepted for processing by the telephone company 25.

At step S210 the long distance provider 10 receives the rejection record (i.e., "2166") due to slamming protection on the customer's account and submits notification of rejected records to the TPV vendor 20, depending upon the arrangement between the long distance provider 10 and the TPV vendor 20. If notification is submitted to the TPV vendor 20, then it may include a list of the records that were rejected over a certain period of time (e.g., in a given day). Alternatively, notification may be provided to the TPV vendor 20 one record at a time. Based on the list of rejected records due to slamming protection, at step S212 the TPV vendor 20 reviews the previously made recordings (i.e., E3WC recordings) of the customer's consent and verifies the customer's 15 approval to remove the slamming protection. At this point, if the TPV vendor 20 had not done so previously, the TPV vendor 20 may make a cropped recording of the original recording, as previously discussed.

At step S214 the long distance provider 10, or the TPV vendor 20 acting under direction of the long distance provider 10, sends a file to the telephone company 25 with account information and a link (e.g., URL hyperlink) to the original or cropped recording, (i.e., E3WC recording), as the case may be. Alternatively, the file includes account information and links for a plurality of customers. At step S216, the telephone company 25 receives the file and checks to see if the customer has an account with the telephone company 25. If the telephone company 25 receives account information and links for a plurality of customers, the requests may be processed individually. If the customer 15 does not have an account with the telephone company, the request is rejected at step S220 and a disposition file is sent to the long distance provider 10 at step S236. If the customer 15 is determined to be an account holder at step S218, then a determination is made at step S222 as to whether the customer 15 has slamming protection. If the customer 15 does not have slamming protection, the request is rejected at step S224 and a disposition file is sent to the long distance provider 10 at step S236. In this case, the long distance provider 10 may resubmit a request to change the customer's PIC and/or LPIC through known processes. If the customer 15 is determined to have slamming protection at step S222, then the telephone company 25 (or an agent thereof) reviews the E3WC recording at step S226. If the agent denies the request at step s228 (for reasons discussed below), then the request is rejected at step S230 and a disposition file is sent to the long distance provider 10 at step S236. If the agent approves the request at step S228, then a service order is generated at step S232. The service order removes the slamming protection from the customer's account at step S234. In alternative embodiments, at step S234, the service order may provision any service or function that requires customer consent. At step S236, a disposition file is sent to the long distance provider 10 and/or the TPV vendor 20 notifying the recipient of the disposition, thus completing the E3WC.

Figure 3:
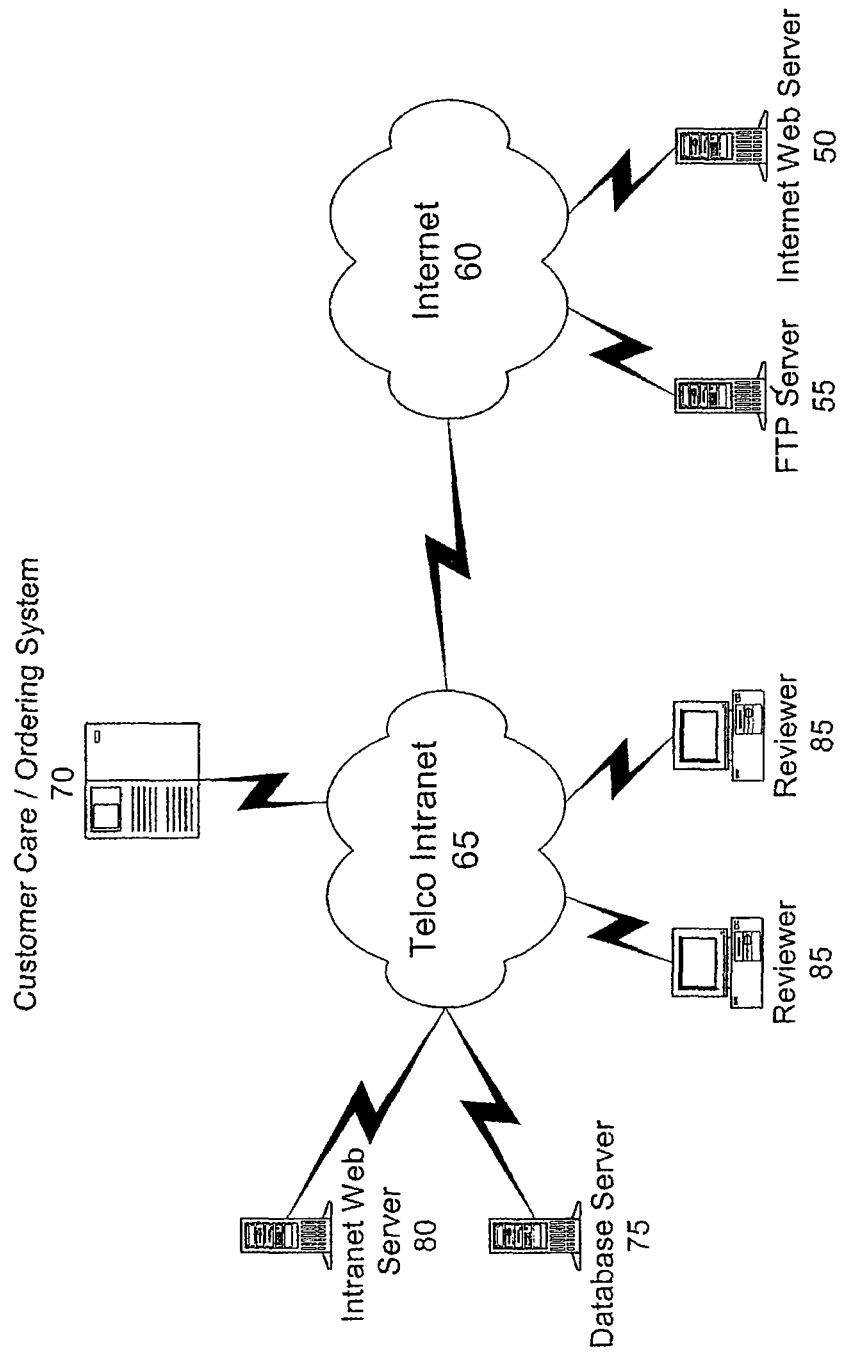
FIG. 3 is a block diagram showing an exemplary telecommunications network, according to an aspect of the present invention.

FIG. 3 is an exemplary telecommunications network, according to one aspect of the present invention. The network includes an internet web server 50, an FTP server 55, the Internet 60, a telephone company intranet 65, a customer care ordering system 70, a database server 75, an intranet web server 80, and desktops used by the reviewer 85. The internet web server 50 may comprise any known server that supports hypertext transfer protocol (HTTP). The FTP server 55 may comprise any known server that supports standard FTP. The customer care ordering system 70 comprises, for example, an IBM legacy mainframe on a multiple virtual storage (MVS) operating system. The database server 75 comprises, for example, an Intel Zeon Multi-Processor on a Windows 2000 Server operating system and runs the Microsoft SQL Server 2000 database management system. The intranet web server 80 comprises, for example, an Intel Zeon Multi-Processor on a Windows 2000 Server operating system and runs Microsoft Internet Information Server. Each reviewer 85 comprises, for example, an Intel Desktop on a Windows NT/2000 operating system and runs Microsoft Internet Explorer 5.0. Those skilled in the art will appreciate that the present invention may also be implemented on hardware, operating systems, database management systems, and software other than those mentioned.

The internet web server 50 may be operated by the long distance provider 10 and/or the TPV vendor 20. In the alternative, it may be operated by the telephone company 25 or an agent thereof. The internet web server 50 stores the E3WC audio recordings of the script and responses that are created by the TPV vendor 20. That is, the audio files recorded by the TPV vendor 20 reside on the internet web server 50. The FTP server 55 may be owned by the telephone company 25 and permits an exchange of files between the telephone company 25 and the long distance provider 10 and/or the TPV vendor 20 over the Internet 60. The telephone company 25 also has a firewall (not shown) and a gateway (not shown) located between the Internet 60 and the telephone company intranet 65. The customer care ordering system 70 maintains the records of the telephone company's customers. The customer care ordering system 70 receives requests from the long distance provider 10 and/or the TPV vendor 20 and compares the data within the requests against the customer records stored in a database. Further, the customer care ordering system 70 generates service orders in situations where the customer's slamming protection is to be removed.

The database server 75 stores requests from the long distance provider 10 and/or the TPV vendor 20, in response to a "2166" rejection, asking the telephone company 25 to remove a customer's slamming protection. The intranet web server 80 stores the web page that allows the reviewer 85 to access and listen to the recordings made by the TPV vendor 20, as well as approve or deny requests to remove a customer's slamming protection. The reviewer 85 uses a graphical user interface (GUI) on desktops, for instance, to click on an icon to listen to the audio recording. In addition, all of the account information associated with the recording is displayed on the GUI. An approval by the reviewer 85 is transmitted via the telephone company intranet 65 to the customer care ordering system 70 where a service order is prepared. Batch jobs are periodically run throughout each day to execute the service orders. In addition, the reviewer 85 sends a disposition file (as will be discussed later) to the FTP server 55 where it may be reviewed by the long distance provider 10 and/or the TPV vendor 20. In this regard, the telephone company 25 may send one file, at the end of each day for instance, reflecting all of the dispositions for that day.

A file containing account information and a URL link to respective recording files is sent to the telephone company 25 via a secured FTP connection at predetermined intervals, e.g., daily. Security of the recording files is embedded in the URL either through the use of a secured connection (i.e., https://) or through the passing of security tokens, in a known manner. To achieve the security of the recording files, the telephone company 25 will provide the sender with the IP address and/or host name of the designated FTP server, as well as an account name and password. Each record in the file represents a request to remove slamming protection from the specified account. An exemplary record is illustrated in FIG. 4.

FIG. 4 shows an exemplary record sent from a long distance provider to the telephone company. The record 400, a carrier request (CR) file definition, includes a position column 401, a format column 402, a description column 403, and a CARE position column 404. The position column 401 indicates the positions within the record (i.e., the position of the bytes associated with a field) that a particular variable is located. The format column 402 indicates the type and length of the data being transmitted. That is, an "X" indicates that an alphanumeric value must be populated and a "9" indicates that a numeric value must be populated. The length in "( )" indicates the number of characters the value may hold.

The description column 403 identifies the element corresponding to the position and format in columns 401 and 402, respectively. The CARE position column 404 indicates the positions where the data may be located in an original CARE record submitted to the telephone company to change the customer's long distance carrier, only to have the request rejected due to the existence of slamming protection on the account. The record 400 may also contain other information, which may or may not include the "2166" transaction code from the reject record, as identified in step S204 in FIG. 2.

Rows 405 and 406 include the four character alphanumeric identification codes of the long distance carrier and the local exchange carrier, respectively. Row 407 identifies the ten digit working telephone number (WTN) of the customer 15. Row 408 includes a one character alphanumeric jurisdictional indicator that identifies whether the request pertains to an intraLATA LPIC change (value=A) or an interLATA PIC change (value=E). In addition, the telephone company 25 may arrange an agreement with the long distance provider 10 and/or TPV vendor 20 so that other values may be populated. For instance, a "B" may be populated in the row 408 as a convenience to the long distance provider 10, in which case the records containing a "B" would be split into separate intraLATA and interLATA records.

Row 409 includes a 6 digit date (in yymmdd format) as found on the telephone company's "2166" rejection record that was previously sent to the long distance provider 10. Row 410 includes a one character alphanumeric designation as to whether the recorded file is in English (value=E) or Spanish (value=S). Row 411 is reserved for a one character alphanumeric value that will be populated by the telephone company 25 with a disposition code in response to the CR file definition. Row 412 is reserved for future use for a value not exceeding seventy-three alphanumeric characters. Row 413 is reserved for a variable length URL of unlimited length that points to the TPV vendor's recording file, associated with the particular account (i.e., WTN) identified in the CR file definition.

Referring to row 413, the URL is a variable length field to accommodate URLs of any length. Via the URL, the provider of the recording is capable of specifying not only the location of the recording, the protocol, the recording format, and the access method.

The E3WC recording may comprise any suitable format including, but not limited to known formats such as .wav, .mpg, .wma, .au, .aiff, .mpa, .gsm, .vmf, .ra, .vox, etc. Further, the technology used to provide access to the recordings may include, but is not limited to CGI, ASP, DLL, htm, JavaScript, etc. While the TPV vendor 20 may allow direct access to its sound files (e.g., https://www.nameoffile.wav), it may also have an intermediate layer of software as a means of preventing unlimited access to its data. Thus, the file may be accessed by passing a dynamic parameter (e.g., the WTN or tn, for short) from one page to another by appending the parameter to the URL reference of the target page. As is known, parameters may be passed with a URL by appending the name of the variable that is being passed and its associated value, separated by a "?". For instance, an exemplary URL that may be provided is shown as follows: https://www.tpvvendor.com/retrieverecording.cgi?tn=1234567890. In this example, the hyperlink passes a variable named "tn" with a value of 1234567890. While this URL does not directly reference the .wav file, it determines the location of the file and presents it to the user, in this case, to the reviewer 85.

When the reviewer 85 references the URL (i.e., by clicking on an icon, for instance), the URL causes the recording to be opened and played using the default media player associated with the file extension or by a custom interface defined by the TPV vendor 20. For example, the URL could cause the browser to open a new pop up window that provides a custom or embedded media player, or any other player that allows a user to listen and perform basic functions such as play, pause, stop, fast forward, and rewind.

At predetermined intervals (e.g., daily) the telephone company 25 sends a file, via a secured FTP connection, to the long distance provider 10 or TPV vendor 20 reflecting the dispositions of all of the records processed during the interval. Thus, the long distance carrier 10 or TPV vendor 20 must provide the IP address and/or host name of their designated FTP server, as well as an account name and password.

FIG. 5 is an exemplary record sent from the telephone company to the long distance provider. The record 500, a CR disposition file definition layout, is identical to the record shown in FIG. 4, except that a disposition code is no longer reserved, but would be populated by an appropriate disposition code in row 511. Due to the correspondence between FIG. 4 and FIG. 5, the various elements in FIG. 5 will not be discussed again for the sake of brevity. Exemplary disposition codes are provided in TABLE 1 below and discussed thereafter.

TABLE 1

| CODE | INDICATION | EXPLANATION |
| --- | --- | --- |
| 0 | Processed | Slamming protection has been removed |
| 1 | Invalid Account | Customer is not an account holder |
| 2 | Toll Restriction | Customer has toll restriction on account |
| 3 | No Slamming Protection | Slamming protection not on account |
| 4 | Inaudible | All or part of recording is inaudible |
| 5 | Invalid Script | Standard script not used |
| 6 | Invalid Information | Information does not match customer |
| 7 | Customer Denied | Customer denied request |

Specifically, a disposition code of "0" indicates that slamming protection has been removed from the account by the telephone company 25. A disposition code of "1" indicates an invalid account condition, meaning that the customer is not a customer of the telephone company 25, for instance. A disposition code of "2" indicates that the customer 15 has toll restriction on the account, meaning that the customer 15 has blocked the ability to dial long distance telephone calls from the specified WTN. A disposition code of "3" indicates that no slamming protection exists on the account. A disposition code of "4" indicates that all or a portion of the recording is inaudible. A disposition code of "5" indicates an invalid script, meaning that the E3WC script employed by the TPV vendor 20 was inappropriate or otherwise unacceptable. A disposition code of "6" indicates that the information provided about the customer 15 does not match the account records. For instance, a telephone number or social security number recorded in the audio file do not match those listed in the customer's account stored at the customer care ordering system 70. A disposition code of "7" indicates that the customer denied authorization to remove slamming protection from the account, e.g., the recording was not an explicit consent by the customer to remove the slamming protection.

Figure 6:
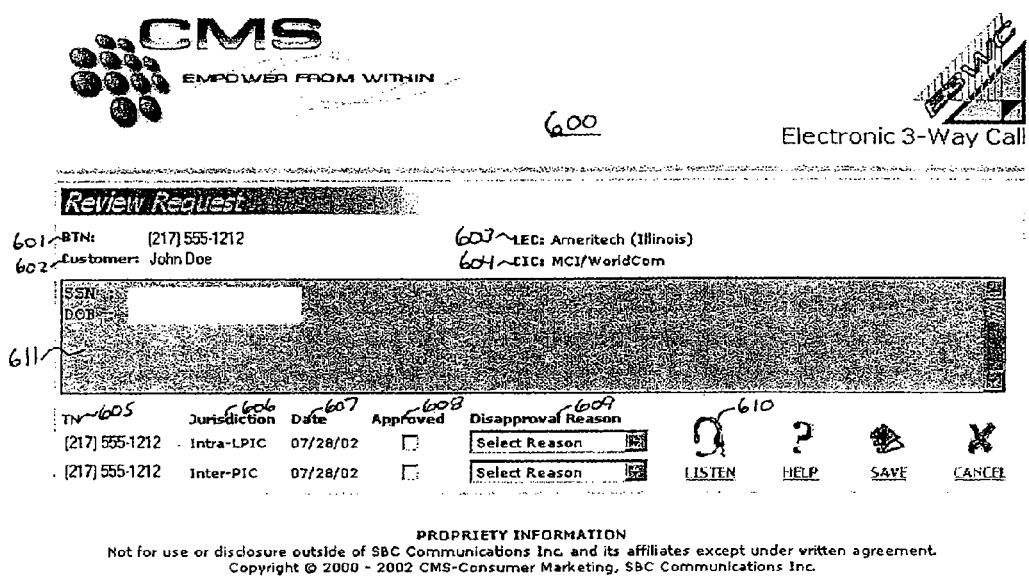
FIG. 6 is an exemplary web page, according to an aspect of the present invention.

FIG. 6 is an exemplary web page according to an aspect of the present invention. The web page 600 permits access to customer account information that is stored at the customer care ordering system 70 and request information that is stored at the database server 75.

The web page 600 includes a billing telephone identifier (BTN) 601 and a customer identifier 602 that identify customer specific information. A local exchange carrier (LEC) identifier 603 and a carrier identification code (CIC) identifier 604 identify the telephone company 25 and the long distance carrier 10, respectively. A telephone number (TN) column 605 provides the WTN and a jurisdiction column 606 indicates whether the request pertains to an intra-LATA LPIC or inter-LATA PIC request. A date column provides the date of the request in column 607. When a request is approved, a check is placed in column 608 by the reviewer 85. In the event that a request is denied, the reason for the denial is indicated using a drop down menu in column 609.

A listen icon 610 is linked to the URL of the audio file in a known manner such that, when clicked, it causes a pop-up window (not shown) to be displayed to the reviewer 85 and also activates the audio file. That is, the recording begins to play. In addition, the pop-up window includes play, pause, stop, fast forward, and rewind functions so that the reviewer 85 may control the recording as needed. A message window 611 includes customer identifying information.

In operation, when a representative of long distance provider 10 makes a sale to the customer 15 the call is transferred to the TPV vendor 20. An IVR at the TPV vendor 20 performs TPV and runs an E3WC script in a manner previously discussed. In the alternative, as stated earlier, the long distance provider 10 may run the E3WC script. After the script and responses have been recorded, the TPV vendor 20 disconnects the telephone call with the customer 15.

Thereafter, the TPV vendor 20 may notify the long distance provider 10, in a known manner, that the TPV has been completed. Next, the long distance provider 10 submits a request to the telephone company 25 to change the customer's PIC and/or LPIC. This request is typically sent via CARE, in a known manner.

From there, the customer care ordering system 70 accesses the request, performs a look up in its database, and determines that the WTN associated with the request has slamming protection. As a result, the customer care ordering system 70 dispatches a "2166" rejection record via CARE using known processes, if the account has slamming protection on it.

Based on the list of rejected records, the TPV vendor 20 retrieves the rejection records, either directly or with the support of the long distance provider 10. Then, the TPV vendor 20 or long distance provider 10, for each "2166" record, reviews the previously made E3WC recordings of the customer's consent and verifies the potential customer's 15 approval to remove the slamming protection.

The TPV vendor 20 then sends a CR file definition (or multiple CR file definitions) over the Internet 60 to the FTP server 55; although, this transmission may originate from the long distance provider 10. The CR file definition contains customer account information and a link (e.g., URL hyperlink) to the E3WC recording made by the TPV vendor 20. Thereafter, the telephone company 25 accesses the CR file definition that is stored on the FTP server 55 and through the telephone company intranet 65 stores the request on the database server 75. The request (or requests) are time stamped to reflect the original date of the "2166" record, the date of receipt of the CR file definition, and the time that the record was stored on the database server 75.

Then, the customer care ordering system 70 accesses the CR file definition via the telephone company intranet 65 and compares each record to the corresponding customer records stored in its database. If a corresponding customer record is not located in the database, then the customer care ordering system 70 sends a message indicating this condition through the telephone company intranet 65 and the Internet 60 to the FTP server 55 where it may be reviewed by the long distance provider 10 and/or the TPV vendor 20.

Otherwise, if a corresponding customer record is located, then a determination is made as to whether the customer has slamming protection on their account. If no slamming protection exists on the account, then the customer care ordering system 70 sends a message indicating this condition through the telephone company intranet 65 and the Internet 60 to the FTP server 55 where it may be reviewed by the long distance provider 10 and/or the TPV vendor 20. If a corresponding customer record is located in the customer care ordering system 70 and the customer is determined to have slamming protection on their account, then the customer care ordering system 70 sends a message through the telephone company intranet 65 to the reviewer 85 indicating which CR file definition records to access so that respective audio files may be reviewed.

The reviewer 85, accessing the web page 600 stored on the intranet web server 80, listens to the respective sound files identified by the customer care ordering system 70. The reviewer 85 has access to these files through the database server 75 via the telephone company intranet 65. By clicking on the listen icon 610, the reviewer 85 listens to the E3WC recordings, as previously discussed. If the reviewer 85 denies the request, then a rejection message is sent from the reviewer 85 via the telephone company intranet 65 through the Internet 60 to the FTP server 55 where it may be reviewed by the long distance provider 10 and/or the TPV vendor 20.

An approval by the reviewer 85 is transmitted via the telephone company intranet 65 to the customer care ordering system 70 where a service order is prepared. Then, the reviewer 85 sends a disposition file via the telephone company intranet 65 through the Internet 60 to the FTP server 55 where it may be reviewed by the long distance provider 10 and/or the TPV vendor 20.

The service order contains a list of telephone numbers for which slamming protection is to be removed and an indication of whether to remove the PIC and/or LPIC protection. The service order instructs that the slamming protection be removed from the customer's account. That is, a program reads the service order and executes the instructions contained in the service order to remove the slamming protection. In one embodiment, the service order is sent via FTP to a Unix-based service order server applications (SOSA) system which reads the service order and inputs an order into the Ameritech Service Order Negotiation (ASON) subsystem to remove the slamming protection. Then, the ASON sends a success or failure notification message to the customer care ordering system 70 as appropriate. Alternatively, the slamming protection may be removed by other, known processes.

Once the customer's slamming protection has been removed, the customer's designated long distance carrier may resubmit a request to the telephone company 25 to change the customer's PIC and/or LPIC. If appropriate, a database in a switch servicing the customer is changed to reflect the desired change in service. Thereafter, the slamming protection may be reinstated on the account, for instance, at the request of the customer or other known processes.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., HTML, XML, FTP) represent examples of the state of the art. Such standards are periodically superseded by faster or more efficient equivalents having essentially the same functions. Accordingly, replacement standards and protocols having the same functions are considered equivalents.

What is claimed:

1. A system for modifying an account of a customer, the system comprising:
   a memory;
   a processor that stores instructions for modifying the account of the customer;
   a database server that receives and stores a request to modify the account, the request including an electronic address of an audio file comprising a customer's authorization to modify the account; and
   a web server that stores a web page and provides access to the web page to a computer to allow a user to listen to the audio file and to approve the request to modify the account,
   wherein the account is modified in response to the user's approval of the request.

2. The system according to claim 1, wherein the request includes a designation which indicates the language of the customer's authorization.

3. The system according to claim 1, wherein the electronic address of the audio file is a Uniform Resource Locator specifying a location of the audio file.

4. The system according to claim 3, wherein the web page comprises an icon linked to the Uniform Resource Locator, and the Uniform Resource Locator is referenced by the user clicking on the icon.

5. The system according to claim 4, wherein when the Uniform Resource Locator is referenced, the Uniform Resource Locator causes the audio file to be opened and played by a media player.

6. The system according to claim 1, wherein the account is modified by a customer care ordering system that sends a message to the computer indicating the request.

7. The system according to claim 1, wherein the web page comprises a column that is checked by the user to approve the request to modify the account.

8. The system according to claim 7, wherein the computer sends an approval message to the customer care ordering system indicating the request has been approved when the column is checked by the user.

9. A method for modifying an account of a customer, the method comprising:
   storing a request to modify the account in a database server, the request including an electronic address of an audio file comprising a customer's authorization to modify the account;
   accessing a web page with a computer to allow a user to listen to the audio file and to approve the request to modify the account; and
   modifying, with a processor, the account in response to the user's approval of the request.

10. The method according to claim 9, wherein the request includes a designation which indicates the language of the customer's authorization.

11. The method according to claim 9, wherein the electronic address of the audio file is a Uniform Resource Locator specifying a location of the audio file.

12. The method according to claim 11, wherein the web page comprises an icon linked to the Uniform Resource Locator, and the method further comprises referencing the Uniform Resource Locator when a user clicks on the icon.

13. The method according to claim 12, further comprising opening and playing the audio file with a media player when the Uniform Resource Locator is referenced.

14. The method according to claim 9, further comprising sending a message to the computer indicating the request.

15. The method according to claim 9, further comprising checking a column on the web page to approve the request to modify the account.

16. The method according to claim 15, further comprising sending an approval message to a customer care ordering system indicating the request has been approved when the column is checked.

17. A non-transitory computer-readable storage medium encoded with an executable computer program for modifying an account of a customer and that, when executed by a processor, causes the processor to perform operations comprising:
   accessing an audio file based on an electronic address included in a stored request to modify the account, the audio file comprising a customer's authorization to modify the account;
   enabling a user to approve the request to modify the account; and
   sending an approval message to a customer care ordering system indicating the request has been approved when the user approves the request.

18. The non-transitory computer-readable storage medium according to claim 17, wherein the electronic address of the audio file is a Uniform Resource Locator specifying a location of the audio file.

19. The non-transitory computer-readable storage medium according to claim 18, further comprising generating an icon linked to the Uniform Resource Locator, wherein the accessing code segment references the Uniform Resource Locator when the icon is clicked on by the user.

20. The non-transitory computer-readable storage medium according to claim 19, wherein the accessing causes the audio file to be opened and played by a media player when the Uniform Resource Locator is referenced.

* * * * *